(12) United States Patent
Ueda et al.

(10) Patent No.: US 8,172,931 B2
(45) Date of Patent: May 8, 2012

(54) WET-TYPE EXHAUST DESULFURIZING APPARATUS

(75) Inventors: Takuro Ueda, Hiroshima (JP); Takanori Nakamoto, Hiroshima (JP); Atsushi Katagawa, Hiroshima (JP); Hajime Okura, Hiroshima (JP); Hiroshi Ishizaka, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 493 days.

(21) Appl. No.: 12/441,648

(22) PCT Filed: Sep. 19, 2007

(86) PCT No.: PCT/JP2007/068168
§ 371 (c)(1),
(2), (4) Date: Mar. 17, 2009

(87) PCT Pub. No.: WO2008/035703
PCT Pub. Date: Mar. 27, 2008

(65) Prior Publication Data
US 2009/0320687 A1      Dec. 31, 2009

(30) Foreign Application Priority Data

Sep. 19, 2006   (JP) .................................. 2006-252153

(51) Int. Cl.
*B01D 47/06*       (2006.01)
(52) U.S. Cl. ................ 96/270; 96/271; 96/273; 96/322; 261/115; 261/117; 261/118; 95/235
(58) Field of Classification Search ............... 96/243, 96/322, 270–273, 280; 261/115–118; 423/242.1, 423/243.01, 243.08
See application file for complete search history.

(56) References Cited

U.S. PATENT DOCUMENTS 3,907,526 A * 9/1975 Saleem et al. .................. 96/233
(Continued)

FOREIGN PATENT DOCUMENTS

JP           61-185316 A     8/1986
(Continued)

OTHER PUBLICATIONS

English language Abstract of JP 2003-181241 A, Jul. 2, 2003.
(Continued)

*Primary Examiner* — Duane Smith
*Assistant Examiner* — Ives Wu
(74) *Attorney, Agent, or Firm* — Greenblum & Bernstein P.L.C.

(57) ABSTRACT

An absorbing tower is provided in its side wall with a gas entrance for introducing a combustion exhaust gas into the absorbing tower, and an absorbing liquid is sprayed from the nozzles of a spray header into the exhaust gas introduced to rise from the gas entrance. A trough is arranged in the side wall of the absorbing tower and above the gas entrance, and a nose having a horseshoe shape in a top plan view and extending into tower is disposed in the tower side wall portion of the gas entrance other than the portion arranging the trough and at the same or at substantially the same height as the portion of the trough. The absorbing liquid, which is sprayed from the nozzle and drops along the absorbing tower wall portion, is rescattered to the center portion of the absorbing tower excepting the entrance of the absorbing tower, so that the gas-liquid contact efficiency is improved while suppressing an increase in pressure loss, thereby to prevent the drift of the gas at the tower wall portion.

6 Claims, 7 Drawing Sheets

U.S. PATENT DOCUMENTS 5,632,962 A * 5/1997 Baker et al. .................. 422/211
6,550,751 B1 4/2003 Brown et al.

FOREIGN PATENT DOCUMENTS

| JP | 5-293333 A | 11/1993 |
| JP | 2001-327831 A | 11/2001 |
| JP | 2003-181241 * | 7/2003 |
| JP | 2003-181241 A | 7/2003 |

OTHER PUBLICATIONS

English language Abstract of JP 5-293333 A, Nov. 9, 1993.
English language Abstract of JP 61-185316 A, Aug. 19, 1986.
English language Abstract of JP 2001-327831 A, Nov. 27, 2001.

* cited by examiner

Prior Art

ABSTRACT# WET-TYPE EXHAUST DESULFURIZING APPARATUS

TECHNICAL FIELD

The present invention relates to an exhaust desulfurizing apparatus for purifying fuel combustion exhaust gas emitted from a boiler or other combustion apparatus and particularly relates to a wet-type exhaust desulfurizing apparatus that lessens sulfur oxides (hereinafter referred to as "SOx"), soot dust, fuel components, and fuel substances in the exhaust gas.

BACKGROUND ART

Figure 9:
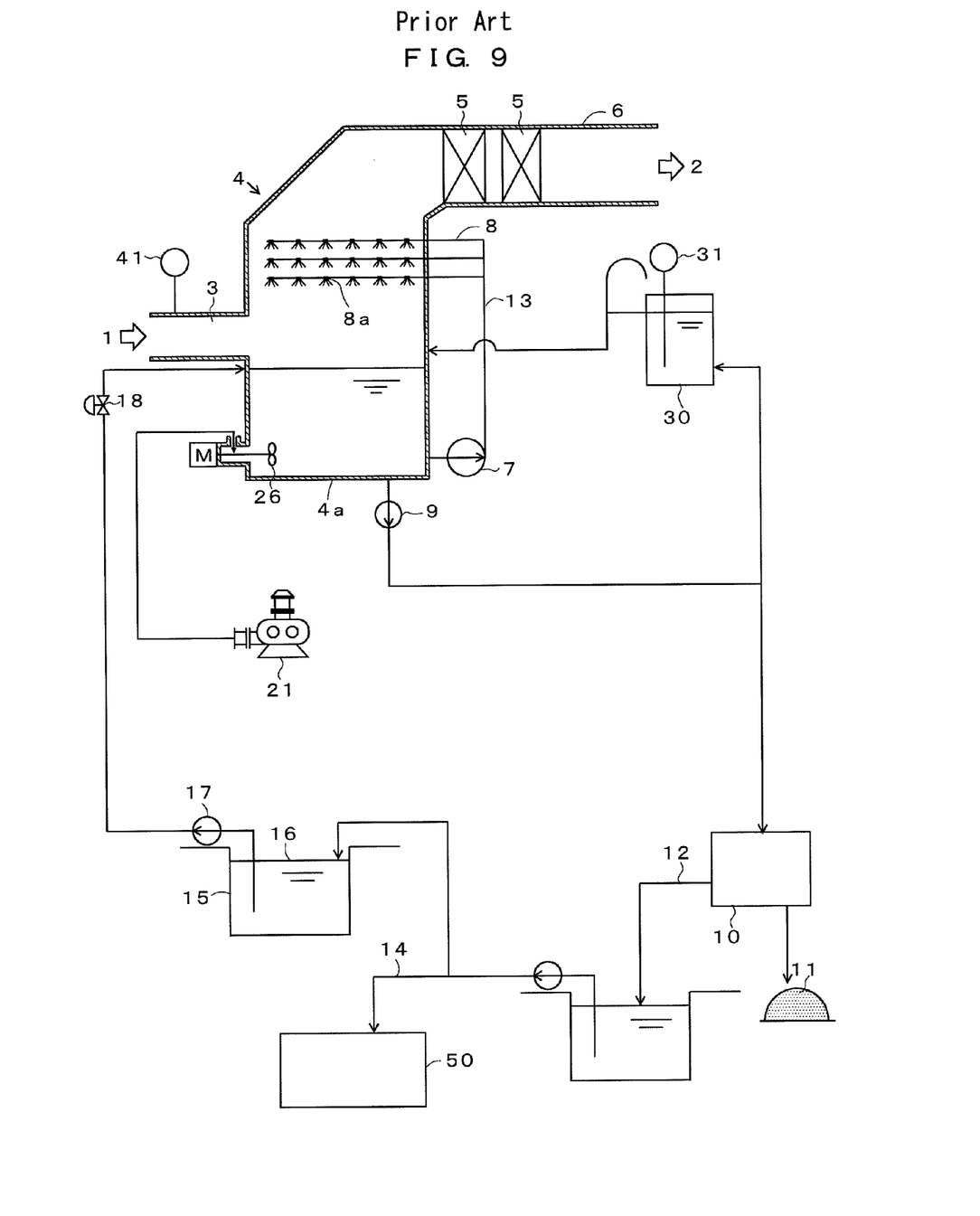
FIG. 9 is a diagram of a system of a wet-type exhaust desulfurizing apparatus according to a conventional art.

As an apparatus for removing sulfur oxides from combustion exhaust gas to prevent air pollution, a wet-type limestone-gypsum desulfurizing apparatus is being put to practical use widely. A system of this desulfurizing apparatus is shown in FIG. 9. An exhaust gas 1 from a boiler, etc., is introduced from a gas entrance 3 into an absorbing tower 4, and by the exhaust gas 1 coming into contact with droplets of an absorbing liquid sprayed from a plurality of spray nozzles 8a disposed in each of spray headers 8 installed in multiple stages in a gas flowing direction inside the absorbing tower 4, SOx in the exhaust gas 1 are absorbed, along with soot dust, hydrogen chloride (HCl), hydrogen fluoride (HF), and other acidic gases in the exhaust gas 1, at droplet surfaces. A mist entrained in the exhaust gas is eliminated by a mist eliminator 5 installed at an absorbing tower exit, and a clean exhaust gas 2 is emitted from a chimney via an exit flue 6 and upon being reheated if necessary.

A SOx concentration in the exhaust gas 1 flowing through the gas entrance 3 of the absorbing tower 4 in this process is measured by an entrance SOx meter 41. Limestone 16, which is a SOx absorbent, is kept in a limestone slurry tank 15, and the limestone slurry is supplied by a limestone slurry pump 17 to a reservoir 4a disposed at a lower portion inside the absorbing tower 4. An amount of the limestone slurry supplied to the absorbing tower 4 is adjusted by a limestone slurry flow control valve 18 according to a SOx absorption amount inside the absorbing tower 4.

The slurry-form absorbing liquid in the reservoir 4a inside the absorbing tower 4 is pressurized by an absorbing tower circulating pump 7 and supplied via a circulation piping 13 to the spray headers 8 disposed in multiple stages in the gas flow direction at an empty tower portion at an upper portion inside the absorbing tower 4. Each spray header 8 is provided with a plurality of spray nozzles 8a, and the absorbing liquid is sprayed from the spray nozzles 8a and put in gas-liquid contact with the exhaust gas. The SOx in the exhaust gas reacts with calcium compounds in the absorbing liquid and converted to calcium sulfite (including calcium bisulfite), which is an intermediate product, drops to the reservoir 4a of the absorbing tower 4, is oxidized to gypsum and thereby converted into a final product (gypsum) by air supplied by an oxidizing air blower 21 into the absorbing liquid of the absorbing tower 4.

By thus supplying air directly into the absorbing tower 4, the reaction of absorption of the SOx in the exhaust gas and the oxidization reaction of the calcium sulfite produced are made to proceed simultaneously to promote the overall reaction and improve desulfurization performance. The oxidizing air supplied to the absorbing tower 4 in this process is made into microscopic bubbles by an oxidizing agitator 26 that agitates the absorbing liquid inside the reservoir 4a to improve usage efficiency of the oxidizing air.

The absorbing liquid is thereafter extracted from the reservoir 4a by an extracting pump 9 in accordance with an amount of gypsum produced, and a portion thereof is fed to a pH meter tank 30 and a pH of the absorbing liquid is measured by a pH meter 31 installed in the pH meter tank 30. The remaining portion of the absorbing liquid is fed to a gypsum dehydration system 10 and recovered as powder gypsum 11.

Meanwhile, water 12, separated at the gypsum dehydration system 10, is reused inside the system as makeup water supplied to the limestone slurry tank 15, etc., and a portion thereof is extracted as wastewater 14 for preventing concentration of chlorine, etc., and fed to a wastewater treatment system 50. At the wastewater treatment system 50, a chemical process by addition of a chemical or treatment by an ion adsorption resin, etc., and a biological process by bacteria are performed to eliminate hazardous substances in the wastewater so that amounts of respective components in the waste water 14 fall below emission standards.

With the above-described conventional art, a portion of the droplets of the absorbing liquid sprayed from the spray nozzles 8a installed on the spray headers 8 drop to the reservoir 4a along a tower wall of the absorbing tower 4.

Because the absorbing liquid that drops along the absorbing tower wall portion absorbs hardly any SOx, an amount of the absorbing liquid sprayed from the spray nozzles 8a that is required to obtain a required desulfurization rate tends to increase.

Figure 8:
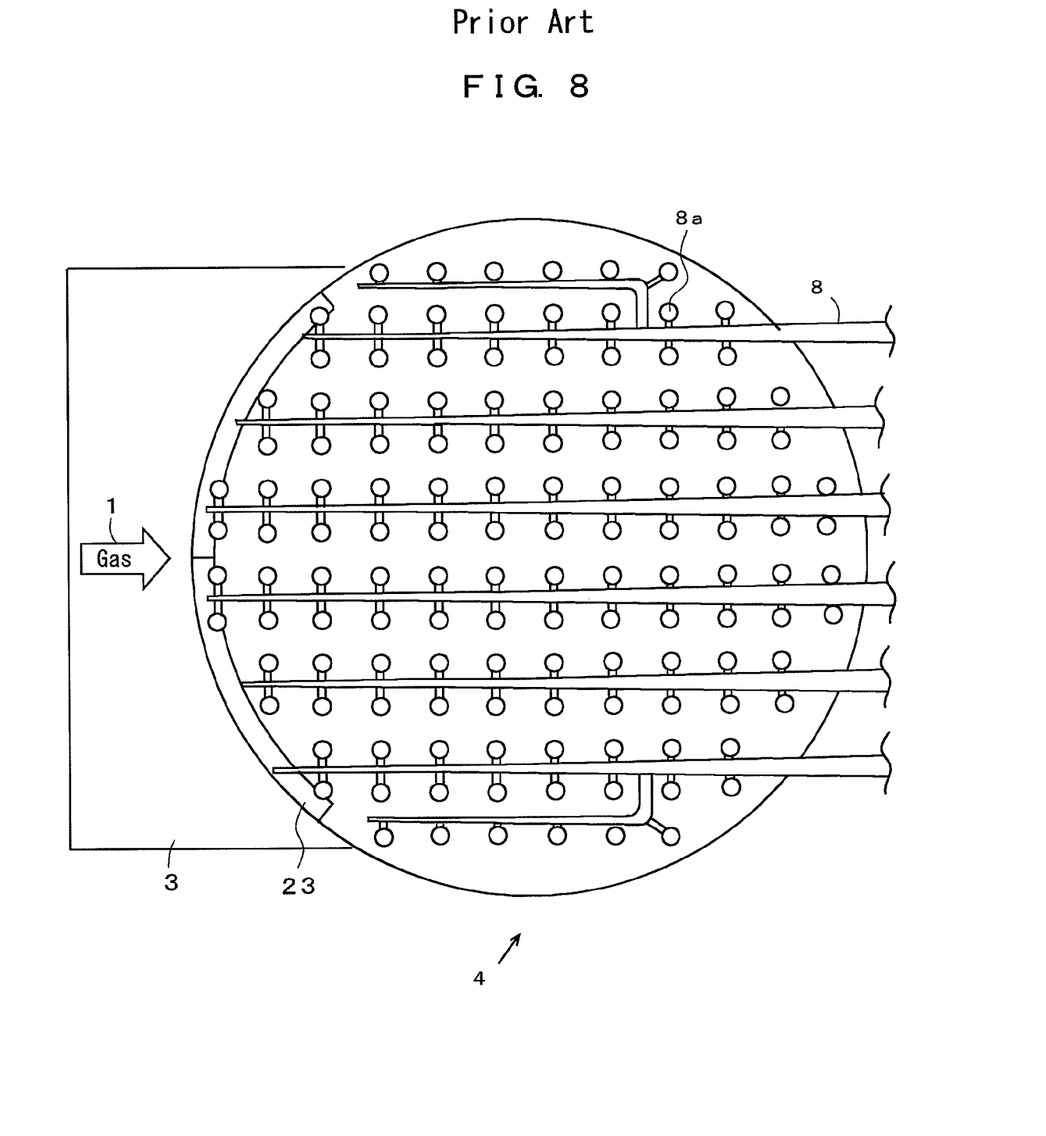
FIG. 8 is a horizontal sectional view of an absorbing tower according to a conventional art.

A horizontal sectional view of the current absorbing tower 4 is shown in FIG. 8, and in the case of the cylindrical absorbing tower 4, a number of spray nozzles 8a lessens near the tower wall and a droplet density of the absorbing liquid at a portion near the tower wall of the absorbing tower 4 tends to be low. A downwardly directed absorbing liquid spraying angle of the spray nozzles 8a indicated by open circles in FIG. 8 is approximately 90 degrees.

When there is such a bias in spray droplet density of the absorbing liquid inside the absorbing tower 4, a large amount of the exhaust gas flows to a portion of low droplet density, preventing adequate gas-liquid contact, degrading exhaust gas SOx absorption performance at portions, and thus affecting the overall desulfurization performance.

As a countermeasure for the above, an invention, with which a ring is installed along an entire circumference of a tower wall portion of an absorbing tower to cause an absorbing liquid flowing along the tower wall to be rescattered toward a center portion of the absorbing tower, is proposed in Patent Document 1.

Meanwhile, an invention, with which a trough is disposed at an upper portion of a gas entrance of an absorbing tower to prevent drying up of solids in the absorbing liquid at the gas entrance, is proposed in Patent Document 2.

Patent Document 1: U.S. Pat. No. 6,550,751
Patent Document 2: Japanese Published Unexamined Patent Application No. 2001-327831

DISCLOSURE OF THE INVENTION

Problems to be Solved by the Invention

Installation of the ring along the entire circumference of the tower wall portion of the absorbing tower as proposed in Patent Document 1 is not economical because the absorbing liquid that is rescattered by the ring becomes a liquid film at an entrance of the absorbing tower and increases a pressure loss of an ascending gas flow inside the absorbing tower.

Also, with the invention described in Patent Document 2, only the drying up of solids in the absorbing liquid at the entrance of the absorbing tower is prevented and no consideration is made whatsoever in regard to putting the absorbing liquid, dropping along the tower wall portion of the absorbing tower, to use in absorption of SOx in the exhaust gas.

An object of the present invention is to cause an absorbing liquid that drops along a tower wall portion of an absorbing tower to be rescattered toward a center portion of the absorbing tower at a portion excepting an entrance of the absorbing tower to improve gas-liquid contact efficiency while suppressing increase of pressure loss and furthermore prevent drift of gas at the tower wall portion.

Means for Solving the Problems

The above object of the present invention is achieved by the following solutions.

A first aspect of the present invention provides a wet-type exhaust desulfurizing apparatus including an absorbing tower, in turn including: a gas entrance, disposed at a side wall and introducing a fuel combustion exhaust gas emitted from a combustion apparatus; and spray headers, disposed in multiple stages in a gas flow direction to spray an absorbing liquid, containing limestone or hydrated lime, onto the exhaust gas ascending upon being introduced from the gas entrance; and where a trough is disposed at a tower side wall at an upper portion of the gas entrance of the absorbing tower, and a nose, having a horseshoe shape in top plan view and extending into the tower, is disposed at a tower side wall portion other than the portion at which the trough is disposed at the gas entrance and at the same height or substantially the same height as the portion at which the trough is disposed.

By making the nose of horseshoe shape protrude into the absorbing tower at the tower wall portion of the absorbing tower, the absorbing liquid that flows along the tower wall portion of the absorbing tower can be rescattered toward a center portion of the absorbing tower to improve gas-liquid contact efficiency. Also, by making exhaust gas that shortcuts along the tower wall portion be directed toward the center of the absorbing tower, drift of the exhaust gas can be prevented.

Furthermore, by installing the trough instead of installing the nose at the upper portion of the exhaust gas entrance of the absorbing tower, formation of a liquid film of the absorbing liquid at this region can be prevented. In particular, because a gas flow velocity becomes high and blow-by of the gas tends to occur readily near a tower wall at a position opposite the gas entrance in the absorbing tower, by installing the trough at the upper portion of the exhaust gas entrance of the absorbing tower, the desulfurization performance can be improved over the conventional configuration while preventing an increase in pressure loss of the exhaust gas inside the absorbing tower by cooperation with the nose of horseshoe shape.

By installing the nose of horseshoe shape at the tower wall surface opposite the gas entrance, a liquid density of the absorbing liquid near the tower wall surface portion opposite the gas entrance can be increased to prevent blow-by of the exhaust gas and make uniform the gas flow velocity of the entirety.

A second aspect of the present invention provides the wet-type exhaust desulfurizing apparatus according to the first aspect where an installation range of the trough at the upper portion of the gas entrance of the absorbing tower is set to 90 to 180 degrees in a horizontal direction and centered at a hypothetical vertical axis line of the tower center portion, and an installation range of the nose is set to 190 to 280 degrees in the horizontal direction and centered at the hypothetical vertical axis line.

A third aspect of the present invention provides the wet-type exhaust desulfurizing apparatus according to the first or second aspect where a length of extension of the nose in the direction of the tower center at the portion excepting the gas entrance and the trough at the upper portion of the gas entrance of the absorbing tower is set in a range of 100 to 500 mm.

A fourth aspect of the present invention provides the wet-type exhaust desulfurizing apparatus according to any of the first to third aspects where a position of installation of the nose is at a tower wall surface at a position below the spray header of a lowermost stage.

A fifth aspect of the present invention provides the wet-type exhaust desulfurizing apparatus according to any of the first to third aspects where a position of installation of the nose is set at a tower side wall surface opposite the gas entrance of the absorbing tower and between the spray header of a lowermost stage and the spray header of a stage adjacently above the lowermost stage.

A sixth aspect of the present invention provides the wet-type exhaust desulfurizing apparatus according to any of the first to fifth aspects where the nose is configured as noses disposed on the tower side wall in a manner that is stepped in the vertical direction so as not to overlap mutually in the vertical direction.

Effects of the Invention

According to the first aspect of the present invention, by cooperation of the trough installed at the upper portion of the gas entrance (duct) of the absorbing tower and the nose of horseshoe shape at the portion excepting the gas entrance, the gas-liquid contact efficiency is improved over the conventional art, the exhaust gas desulfurization performance is also improved in comparison to the conventional art, reduction of a required circulation amount of the absorbing liquid, and reduction of power of a circulating pump can be achieved. Also, by combination of the trough disposed at the gas entrance of the absorbing tower and the horseshoe-shaped nose disposed at the inner wall surface at the portion excepting the gas entrance, the pressure loss at the gas entrance of the absorbing tower can be reduced in comparison to the conventional art and reduction of power of a desulfurizing fan is enabled.

According to the second aspect of the present invention, in addition to providing the effects of the first aspect of the present invention, by making a size of an opening of the gas entrance be of a range spreading at an angle of 90° or more in the horizontal direction and centered about the hypothetical vertical axis line of the tower center portion with respect to the absorbing tower, drift at the entrance can be prevented, and also, by setting an upper limit of the size of the opening of the entrance to 180° centered about the hypothetical vertical axis line of the tower center portion, the strength of the absorbing tower can be maintained.

Figure 4:
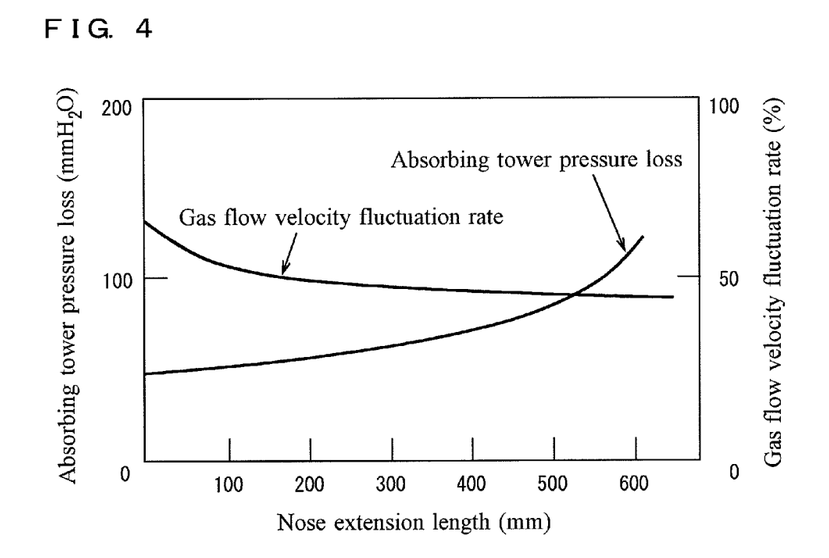
FIG. 4 shows a relationship between an extension length of the nose portion and a pressure loss and a gas flow velocity fluctuation rate of the absorbing tower according to the embodiment of the present invention.

According to the third aspect of the present invention, in addition to providing the effects of the first or second aspect of the present invention, by setting the protrusion length of the nose in a range of 100 to 500 mm, the liquid that flows down along the tower wall can be rescattered satisfactorily, the blow-by of gas can be lessened as much as possible, and the pressure loss of the ascending flow of the gas inside the tower can be suppressed (see FIG. 4).

According to the fourth aspect of the present invention, in addition to providing the effects of any of the first to third aspects of the present invention, by installing the nose at the position below the spray header of the lowermost stage (first stage) at which the amount of the absorbing liquid flowing down along the wall surface is the highest, a high effect of causing the absorbing liquid, flowing as a liquid film that flows down along the wall surface of the absorbing tower, to be rescattered into the absorbing tower is provided.

According to the fifth aspect of the present invention, in addition to providing the effects of any of the first to third aspects of the present invention, by installing the nose at the position between the spray headers of the lowermost stage and the stage adjacently above the lowermost stage at which the amount of the liquid flowing down along the wall surface is the second highest, a high effect of causing a portion of the sprayed absorbing liquid, flowing as a liquid film that flows down along the wall surface of the absorbing tower, to be rescattered into the absorbing tower is provided, and by positioning the nose at the tower side wall surface opposite the gas entrance of the absorbing tower, the pressure loss with respect to the ascending flow of gas is lowered in degree.

According to the sixth aspect of the present invention, in addition to providing the effects of any of the first to fifth aspects of the present invention, by configuring the nose as noses disposed on the tower side wall in a manner that is stepped in the vertical direction so as not to overlap mutually in the vertical direction, the absorbing liquid that is rescattered by each nose is prevented from becoming a uniform liquid film in a horizontal section inside the absorbing tower and an increase in the pressure loss can thus be prevented.

BEST MODES FOR CARRYING OUT THE INVENTION

Embodiments of the present invention shall now be described along with the drawings.

Figure 1:
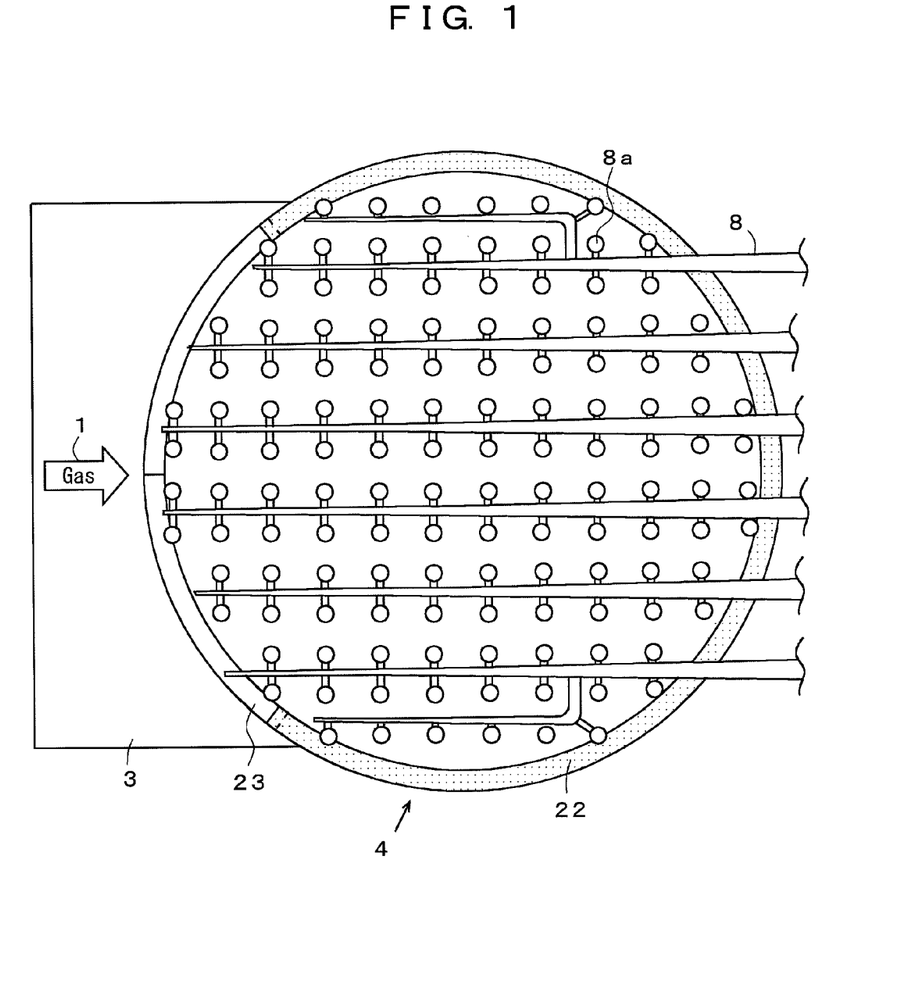
FIG. 1 is a diagram of a configuration where a horseshoe-shaped nose and a trough are installed in combination in an absorbing tower of a wet-type desulfurizing apparatus according to an embodiment of the present invention as viewed from a horizontal section direction.
Figure 2:
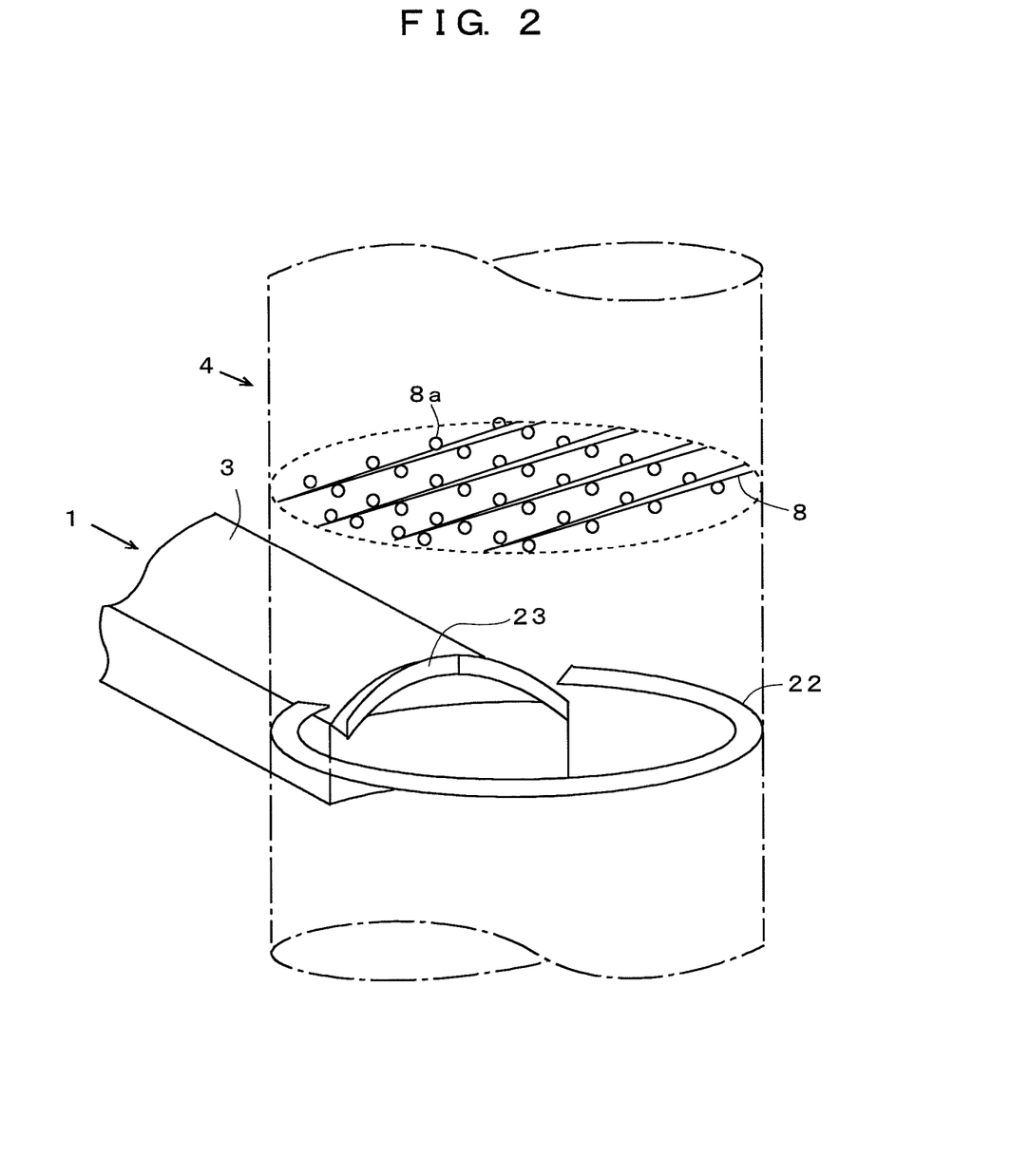
FIG. 2 is a perspective view of an interior of the absorbing tower in the configuration where the horseshoe-shaped nose and the trough are installed in combination in the absorbing tower of the wet-type desulfurizing apparatus according to the embodiment of the present invention.

FIG. 1 is a diagram of an interior of an absorbing tower of a wet-type exhaust desulfurizing apparatus according to the embodiment as viewed from a horizontal section direction, and FIG. 2 is a partial perspective view of the interior of the absorbing tower of FIG. 1. Along an outer circumference excepting an exhaust gas entrance 3 of a tower wall portion of the absorbing tower 4, a horseshoe-shaped nose 22 is protruded into the tower in a horizontal direction, and a trough 23 is installed at an upper portion of a region of the absorbing tower exhaust gas entrance (duct) 3 in which the horseshoe-shaped nose 22 is not disposed.

To prevent drift at the entrance 3, a size of an opening of the gas entrance (duct) 3 is set to be of range spreading at an angle of 90° or more in the horizontal direction and centered about a hypothetical vertical axis line of a tower center portion with respect to the absorbing tower 4. Also, to maintain structural strength of the absorbing tower, an upper limit of the size of the opening of the entrance 3 is set to 180° centered about the hypothetical vertical axis line of the tower center portion.

To install the trough 23 at the upper portion of the gas entrance 3, an installation range of the trough 23 is set to 90° to 180° in the horizontal direction and centered about the hypothetical vertical axis line of the tower center portion. Furthermore, to install the nose 22 at a wall surface portion inside the absorbing tower 4 at which the trough 23 is not installed and so as to partially overlap with the trough 23 as viewed from a vertical direction, the nose 22 is installed in a range of 190° to 280° in the horizontal direction and centered about the hypothetical vertical axis line of the tower center portion. A vertical positional relationship of the installation portions of the trough 23 and the nose 22 with respect to the wall surface is not fixed in particular and these are set at substantially the same height.

Figure 3:
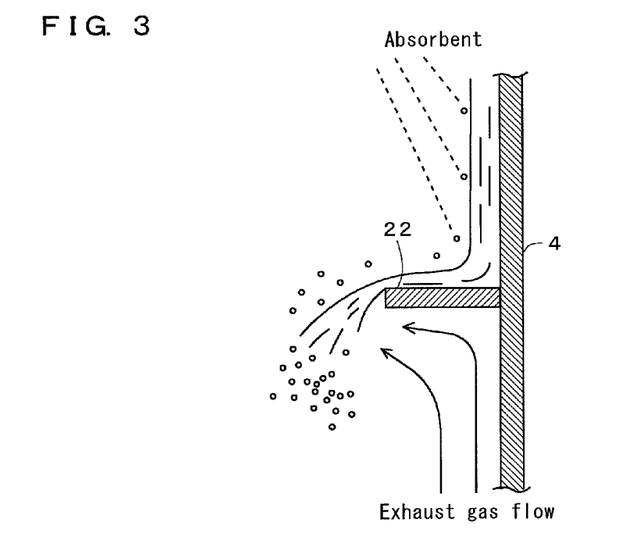
FIG. 3 is a diagram of a state of gas flow and a state of rescattering of an absorbing liquid, dropping along a tower wall, at a nose portion in a vertical section of the absorbing tower according to the embodiment of the present invention.

FIG. 3 is a vertical sectional view of a tower wall surface portion at a portion of the tower wall portion of the absorbing tower 4 at which the horseshoe-shaped nose 22 is protruded. A portion of an absorbing liquid, sprayed from spray nozzles 8a, drops along the absorbing tower wall. By colliding with the horseshoe-shaped nose 22, protruded at the tower wall portion, the absorbing liquid that drops along the tower wall of the absorbing tower is made into microscopic droplets and rescattered toward the tower center portion, thereby improving gas-liquid contact efficiency and improving exhaust gas desulfurization performance.

Also, at the absorbing tower wall portion, a number of the spray nozzles 8a is low, a density of the sprayed absorbing liquid tends to be comparatively low, and the exhaust gas thus shortcuts readily along the absorbing tower wall portion. On the other hand, by protruding the horseshoe-shaped nose 22 at the absorbing tower wall portion, the flow of the exhaust gas that would otherwise shortcut along tower wall portion of the absorbing tower is directed toward the center portion of the absorbing tower, thereby suppressing the shortcutting of the exhaust gas.

FIG. 4 shows a relationship between an extension length of the horseshoe-shaped nose 22 and a pressure loss and a gas flow velocity fluctuation rate of a gas flow inside the tower. When the extension length of the horseshoe-shaped nose 22 is too short, the absorbing liquid that flows down along the tower wall is not rescattered much and an amount of blow-by of gas is high. On the other hand, when the extension length of the horseshoe-shaped nose 22 is too long, a proportion of closure of an absorbing tower wall section becomes large and the pressure loss of the gas flow inside the tower becomes high. An optimal nose extension length is thus 100 to 500 mm.

Desulfurization rates at an absorbing tower exit at an upper portion of the nose and gas flow velocity fluctuation rates are shown according to presence/non-presence of the horseshoe-shaped nose 22 in Table 1. It was thus confirmed that by the horseshoe-shaped nose 22 extending into the tower, the desulfurization rate is improved, and that a high gas flow velocity region (gas shortcutting region) at the absorbing tower wall portion is reduced by the gas flow velocity fluctuation rate at the upper portion of the nose being lowered.

TABLE 1

Gas flow velocity fluctuation rate and desulfurization rate according to presence/non-presence of the nose

|  | Without nose | With nose |
|---|---|---|
| Desulfurization rate (%) | 93.9 | 95.6 |
| Gas flow velocity fluctuation rate (%) * (measurement location: upper portion of nose) | 60.3 | 49.5 |

*Gas flow velocity fluctuation rate = $\dfrac{\text{Standard deviation of the gas flow velocity}}{\text{Average gas flow velocity}}$ A relationship of the installation position of the nose 22 and the desulfurization performance is shown in Table 2.

TABLE 2

Nose installation position and desulfurization performance

|  | Below first stage spray header | Below second stage spray header | Below third stage spray header | Below fourth stage spray header |
|---|---|---|---|---|
| Desulfurization rate (%) | 97 | 96.8 | 95.5 | 94.5 |

* Nose installation location (The spray headers are those of the first and second stages from the lower side.)

The nose 22 rescatters, into the absorbing tower 4, the absorbing liquid that is a portion of the sprayed absorbing liquid flowing as a liquid film that flows down along the wall surface of the absorbing tower 4. An amount of the liquid that flows down along the wall surface is higher at a lower portion. Thus, from Table 2, optimal installation positions of the nose 22 are a position below the spray header 8 of the lowermost stage (first stage) and a position between the spray headers 8 of the lowermost stage and the second stage from the lowermost stage.

Figure 5:
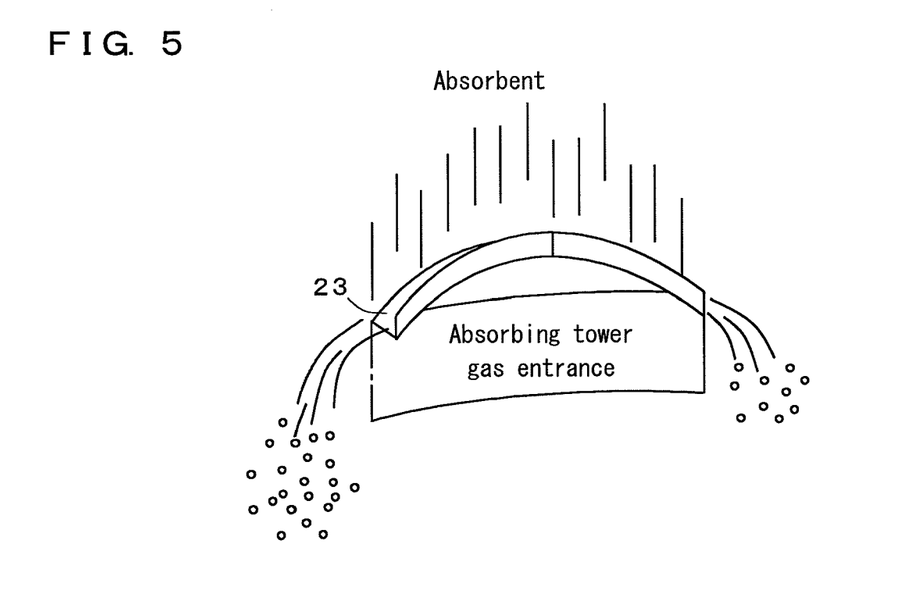
FIG. 5 is a perspective view of a flow of the absorbing liquid dropping along the tower wall at the trough installed at a gas entrance of the absorbing tower according to the embodiment of the present invention.

FIG. 5 is a perspective view of a tower wall surface portion of a portion at which the trough 23 is installed at the absorbing tower gas entrance 3 as viewed from an inner side of the tower. The absorbing tower gas entrance 3 is a portion at which gas of a high gas flow velocity flows in, and due to collision with a large group of dropping absorbing liquid droplets, the pressure loss of the exhaust gas flow tends to be large. Thus, when the nose 22 shown in FIG. 3 is protruded at an upper portion of the absorbing tower gas entrance 3, the rescattered absorbing liquid forms a liquid film at the absorbing tower gas entrance 3 and increases the pressure loss of the exhaust gas flow. Thus, by not making the nose 22 protrude at the upper portion of the absorbing tower gas entrance 3 but by installing the trough 23 to receive the absorbing liquid that drops along the absorbing tower wall, an increase in the pressure loss at the absorbing tower gas entrance 3 can be prevented.

Figure 6:
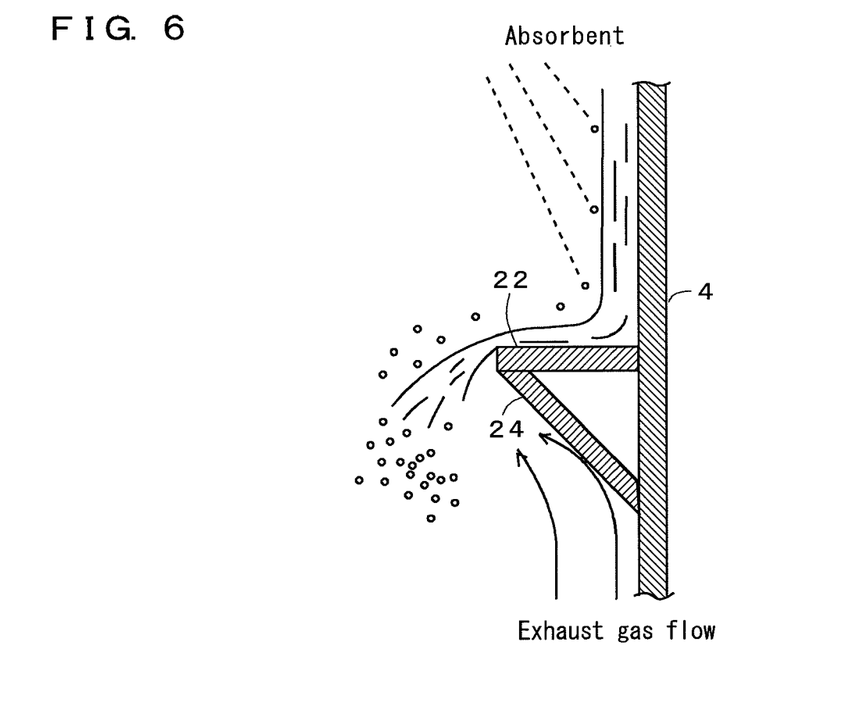
FIG. 6 is a diagram of a state of gas flow and a state of rescattering of the absorbing liquid, dropping along the tower wall, at the nose portion in a vertical section of the absorbing tower according to the embodiment of the present invention.

FIG. 6 shows an example where a supporting plate 24 that guides the exhaust gas toward the tower center is disposed below the nose 22. In regard to the shape of the nose 22, the structure is not restricted in particular as long as the shape enables the absorbing liquid to be rescattered to the absorbing tower center.

Figure 7:
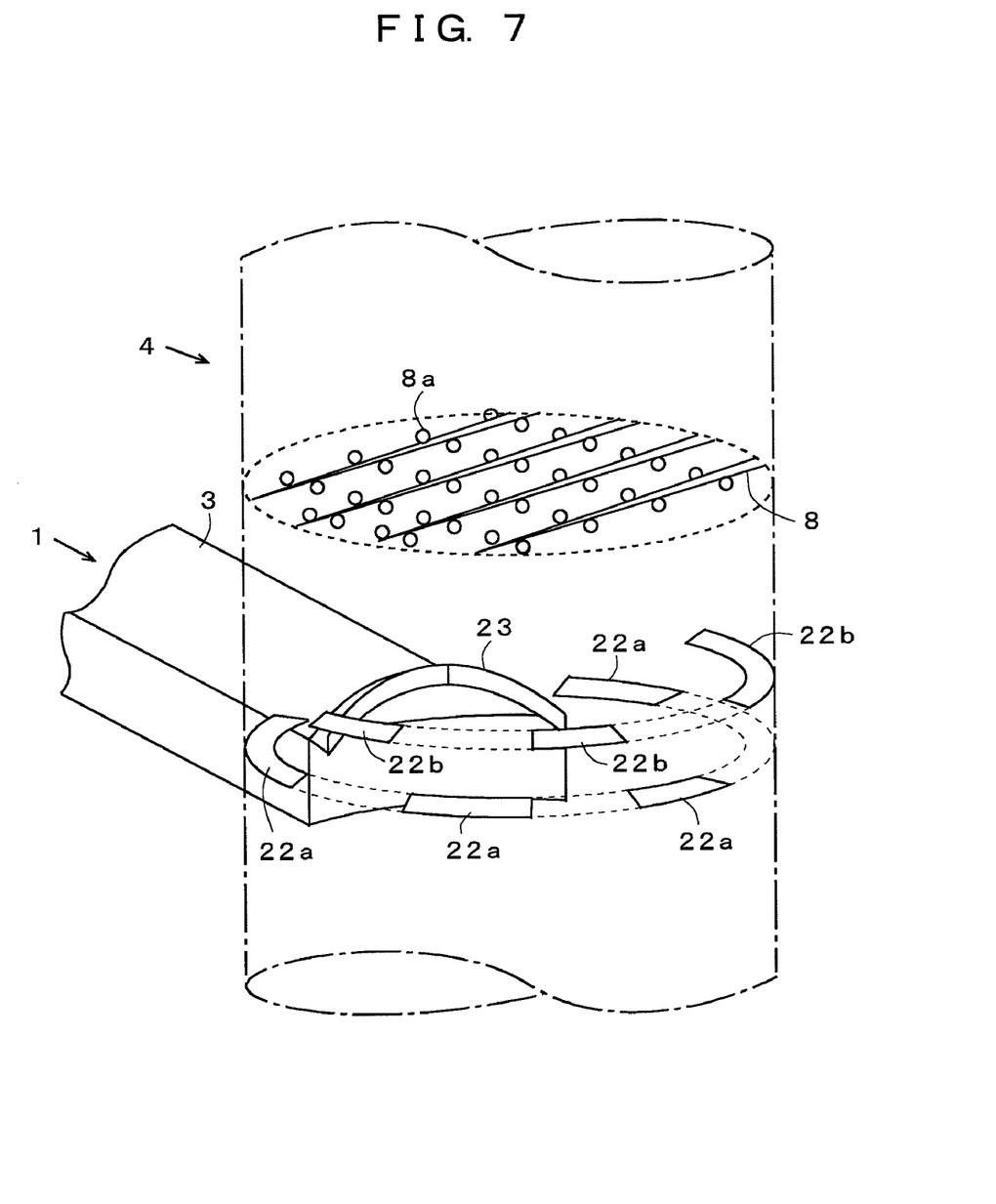
FIG. 7 is a perspective view of an interior of an absorbing tower in a configuration where a horseshoe-shaped nose is configured as stepped nose portions in the absorbing tower of a wet-type desulfurizing apparatus according to an embodiment of the present invention.

FIG. 7 shows another embodiment of the present invention. In the present embodiment, the horseshoe-shaped nose 22 is divided into a plurality of portions that are installed in a stepped manner in two stages along a horizontal plane. Because nose pieces 22a of a lower stage and nose pieces 22b of an upper stage are discontinuous at the respective stage, the absorbing liquid that is rescattered by the nose pieces 22a and 22b do not become a uniform liquid film in a horizontal section inside the absorbing tower and an increase in pressure loss can thus be prevented.

Industrial Applicability

The present invention is high in industrial applicability as a wet-type desulfurization apparatus that enables an absorbing tower to be made compact while preventing an increase in pressure loss of gas flow inside the absorbing tower and a lowering of desulfurization performance due to gas drift.

DESCRIPTION OF SYMBOLS

1, 2: Exhaust gas
3: Gas entrance
4: Absorbing tower
4a: Reservoir
5: Mist eliminator
6: Exit flue
7: Absorbing liquid circulating pump
8: Spray header
8a: Spray nozzle
9: Extracting pump
10: Gypsum dehydration system
11: Gypsum
12: Water
13: Circulation piping
14: Wastewater
15: Limestone slurry tank
16: Limestone
17: Limestone slurry pump
18: Limestone slurry flow control valve
21: Oxidizing air blower
22: Horseshoe-shaped nose
22a, 22b: Nose piece
23: Trough
24: Supporting plate
26: Oxidizing agitator
30: pH meter tank
31: pH meter
41: Entrance SOx meter
50: Wastewater treatment system

What is claimed is:

1. A wet-type exhaust desulfurizing apparatus for purifying a fuel combustion exhaust gas emitted from a combustion apparatus, said wet-type exhaust desulfurizing apparatus comprising an absorbing tower comprising:
   (a) a gas entrance disposed at a side of the absorbing tower wall and introducing the fuel combustion exhaust gas;
   (b) spray headers, disposed in multiple stages in a gas flow direction to spray an absorbing liquid, containing limestone or hydrated lime, onto the exhaust gas ascending upon being introduced from the gas entrance;
   (c) a trough disposed at a tower side wall at an upper portion of the gas entrance of the absorbing tower; and
   (d) a nose, having a horseshoe shape in top plan view and extending into the tower, disposed at a tower side wall portion excepting the portion at which the trough is disposed at the gas entrance and at the same height or substantially the same height as the portion at which the trough is disposed.

2. The wet-type exhaust desulfurizing apparatus according to claim 1, wherein an installation range of the trough at the upper portion of the gas entrance of the absorbing tower is set to 90 to 180 degrees in a horizontal direction and centered at a hypothetical vertical axis line of a tower center portion, and an installation range of the nose is set to 190 to 280 degrees in the horizontal direction and centered at the hypothetical vertical axis line.

3. The wet-type exhaust desulfurizing apparatus according to claim 1, wherein a length of extension of the nose in the direction of the tower center at the portion excepting the gas entrance and the trough at the upper portion of the gas entrance of the absorbing tower is set in a range of 100 to 500 mm.

4. The wet-type exhaust desulfurizing apparatus according to claim 1, wherein a position of installation of the nose is at a tower wall surface at a position below the spray header of a lowermost stage.

5. The wet-type exhaust desulfurizing apparatus according to claim 1, wherein a position of installation of the nose is set at a tower side wall surface opposite the gas entrance of the absorbing tower and between the spray header of a lowermost stage and the spray header of a stage adjacently above the lowermost stage.

6. The wet-type exhaust desulfurizing apparatus according to claim 1, wherein the nose is configured as noses disposed on the tower side wall in a manner that is stepped in the vertical direction so as not to overlap mutually in the vertical direction.

* * * * *